July 15, 1924.

C. G. ROLINE ET AL 1,501,237

FOLDING MACHINE

Filed Aug. 16, 1922

Inventors:
Carl G. Roline.
Charles Norre
By

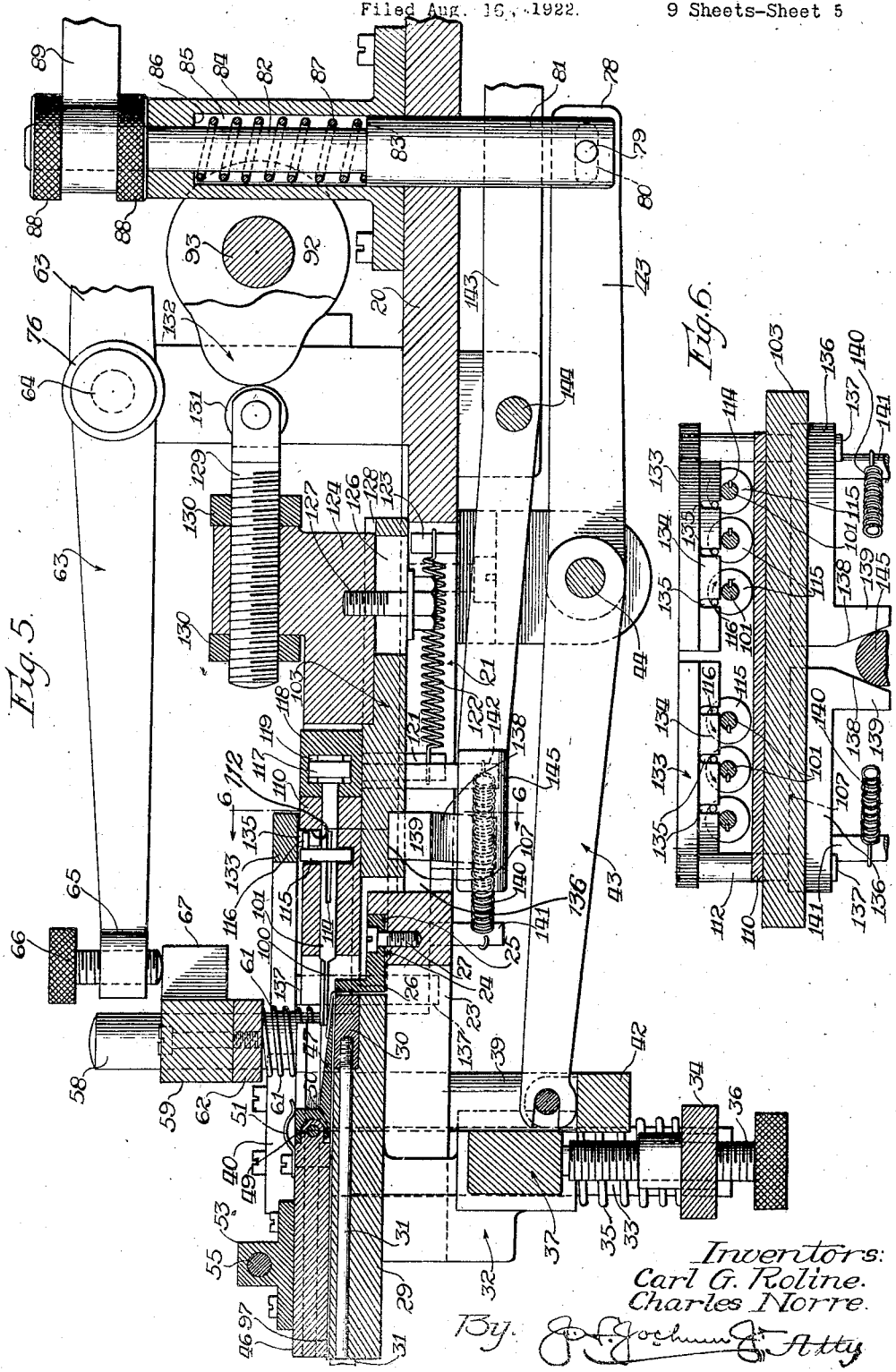

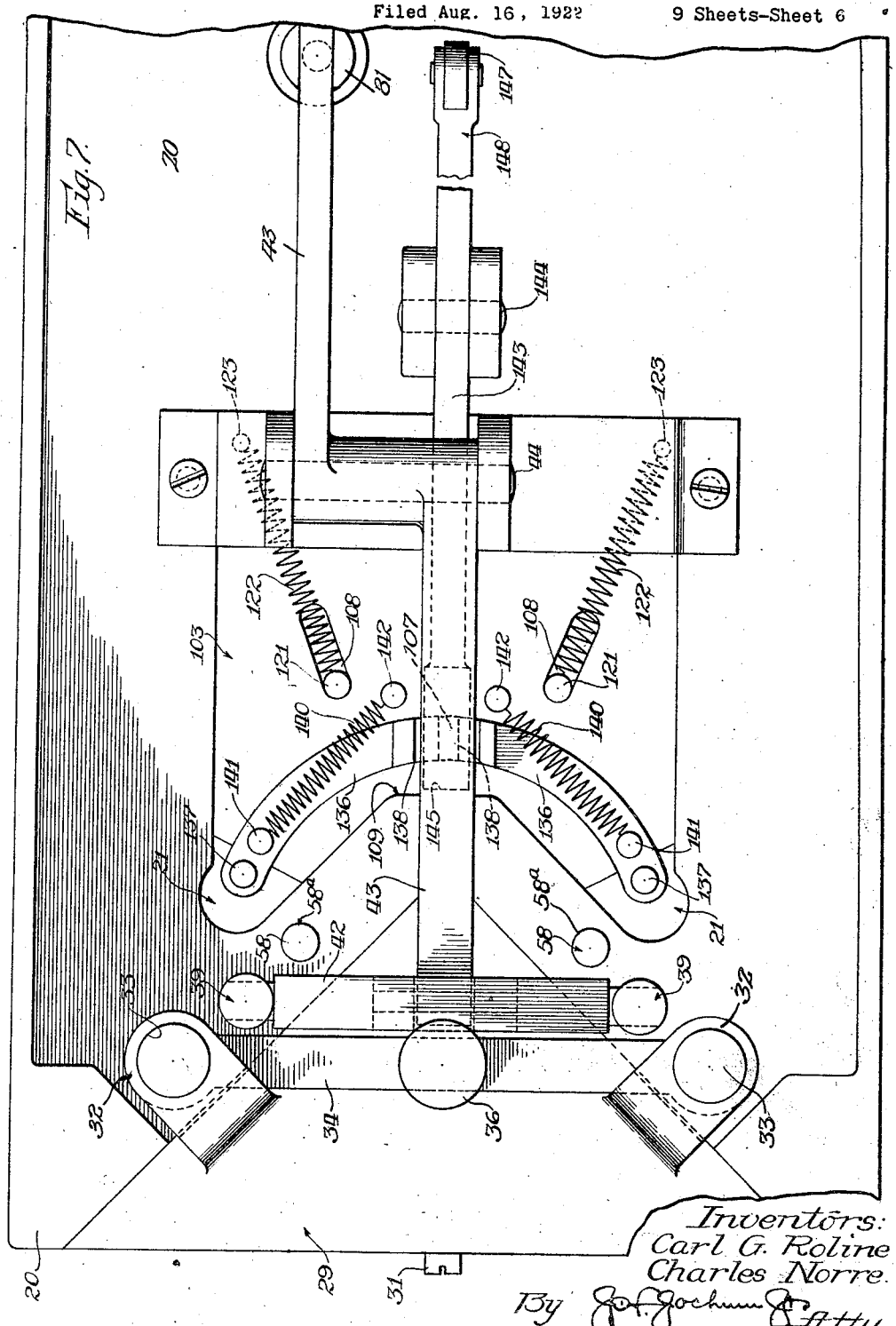

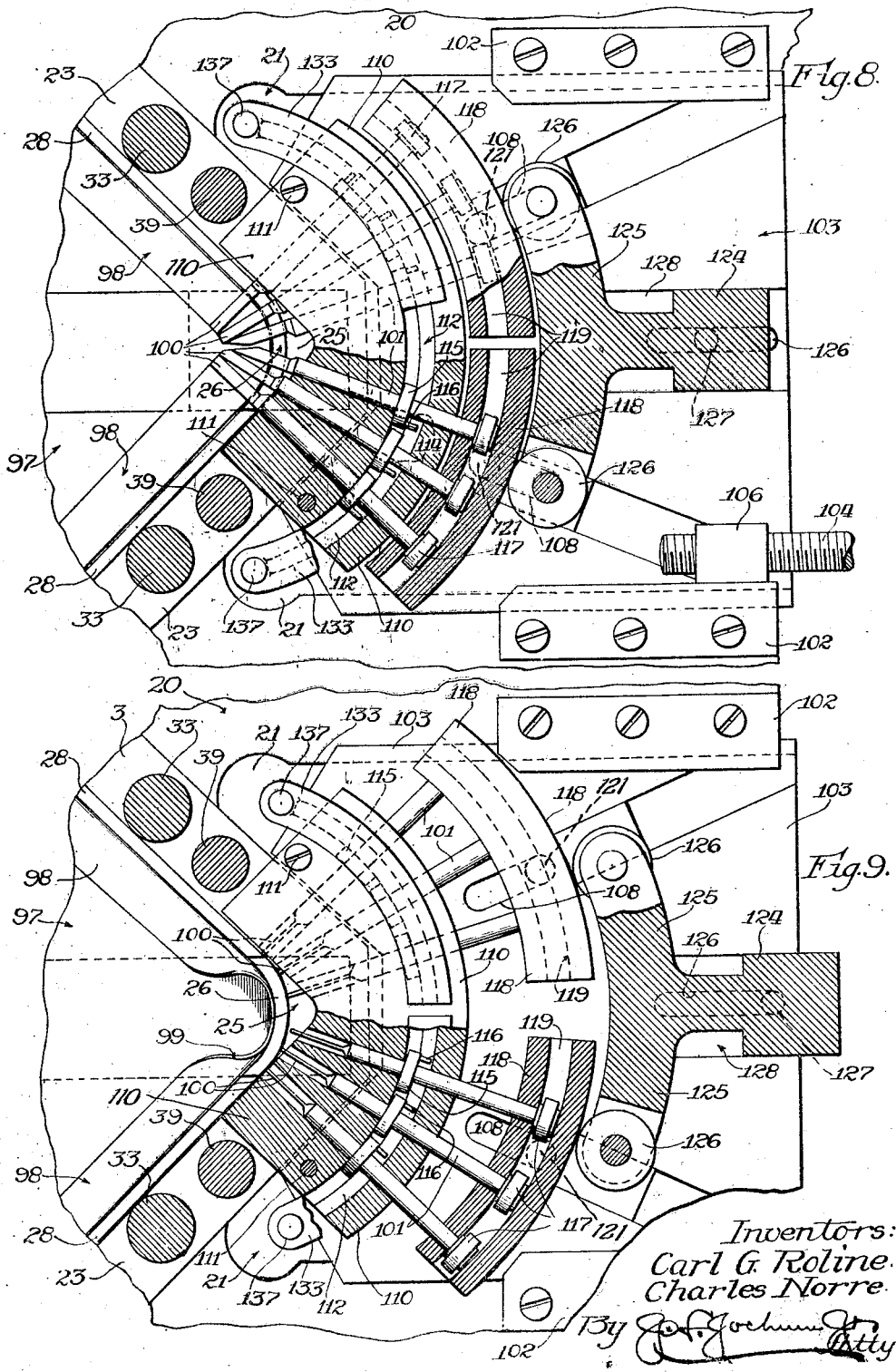

July 15, 1924.

C. G. ROLINE ET AL 1,501,237

FOLDING MACHINE

Filed Aug. 16, 1922

Inventors:
Carl G. Roline
Charles Norre.
By
Atty.

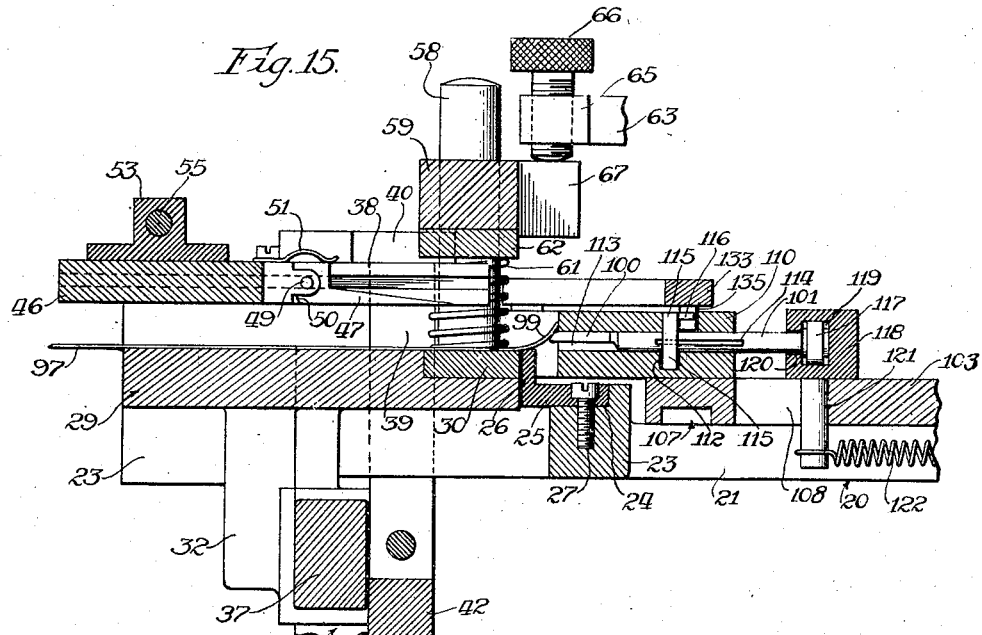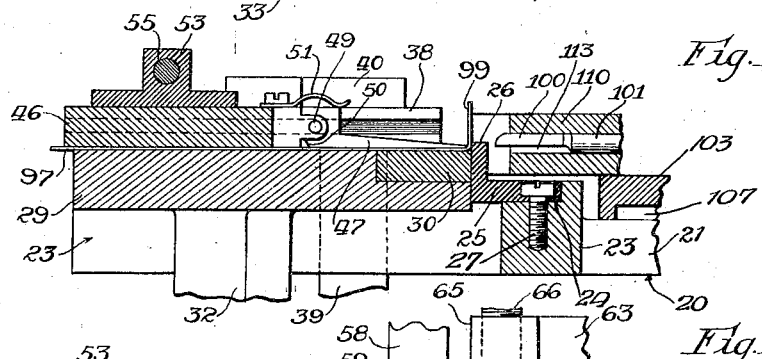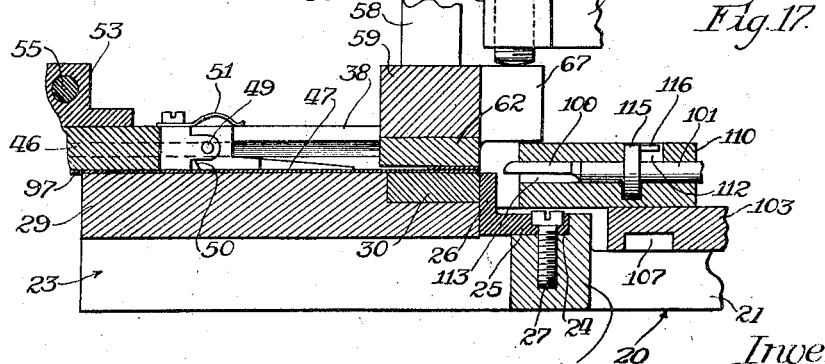

Patented July 15, 1924.

1,501,237

UNITED STATES PATENT OFFICE.

CARL G. ROLINE AND CHARLES NORRE, OF CHICAGO, ILLINOIS.

FOLDING MACHINE.

Application filed August 16, 1922. Serial No. 582,125.

*To all whom it may concern:*

Be it known that we, CARL G. ROLINE and CHARLES NORRE, citizens of the United States, residing at Chicago, in the county of Cook and State of Illinois, have invented certain new and useful Improvements in Folding Machines, of which the following is a specification.

This invention relates to improvements in folding machines, particularly adapted, though not necessarily limited in its use, for folding round corners of book covers, and one of the objects of the invention is to provide an improved machine of this character embodying a slide or member which not only acts as a re-enforcing member for the material at the corner during the folding operation, but which member also constitutes a form over which the material is folded, the use or employment of which member renders it possible to automatically fold the corners of very thin flexible material upon itself, either with or without necessitating the employment of a filler member in the cover.

A further object is to provide improved means for turning down the partially folded material and improved means operating in timed relation with respect to the folding mechanism for sealing down the folded portion.

A further object is to provide an improved machine of this character embodying means whereby the mechanism may be adapted for folding corners of different radii.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which—

Figure 5 is a vertical, longitudinal sectional view as taken on line 5—5, Figure 3.

Figure 6 is a detail sectional view taken on line 6—6, Figure 5.

Figure 7 is a bottom plan view of Figure 4.

Figure 8 is an enlarged detail view, partly in elevation and partly in section of the fingers or members for folding down the material and showing the parts in one position.

Figure 9 is a view similar to Figure 8 showing the parts in another position.

Figures 15, 16 and 17 are detail sectional views showing some of the parts in the different positions which they will assume during the operation of the mechanism.

Figure 1:
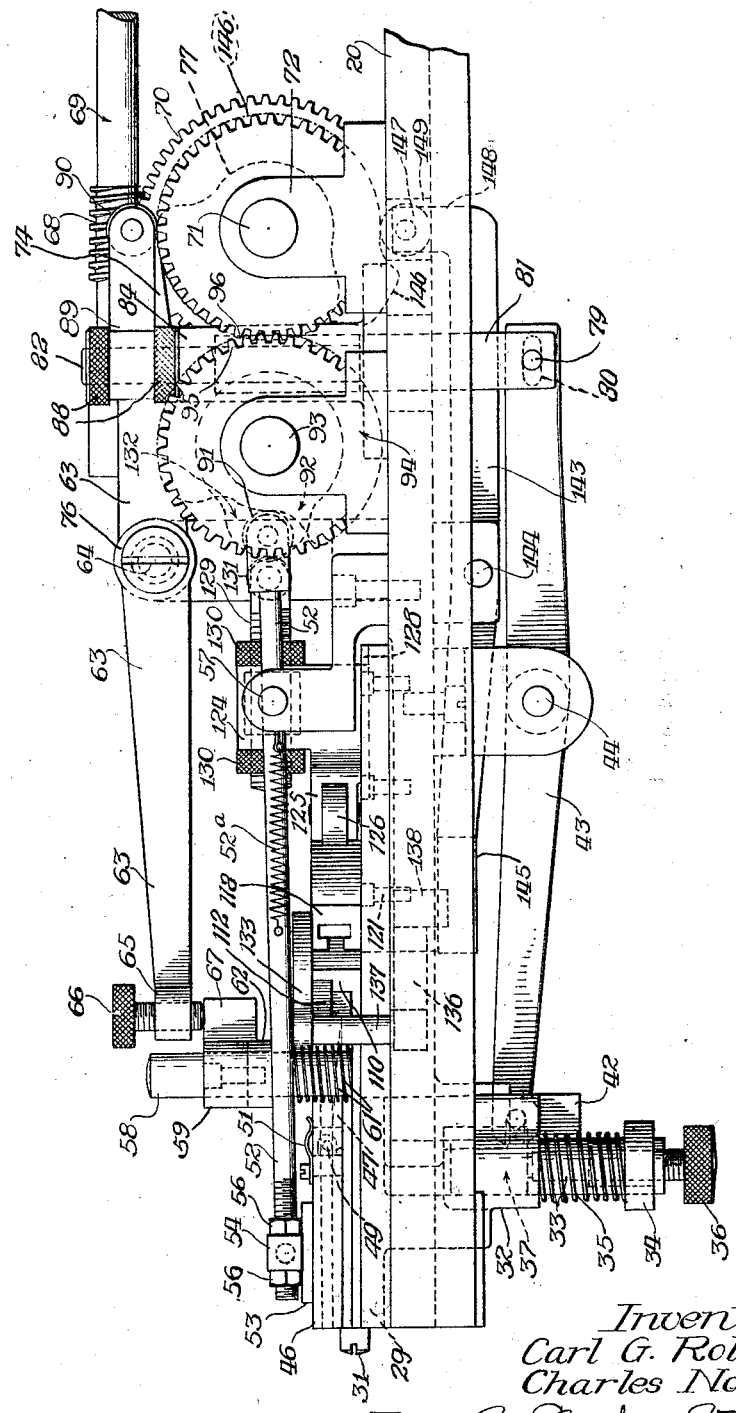
Figure 1 is a side elevation of the machine.

Referring more particularly to the drawings the numeral 20 designates a suitable supporting base for the mechanism and is provided with an opening 21 therethrough and which opening is provided for the purpose of permitting operative connections between portions of the mechanism which are located above and below the base, and the forward end of the base is provided with a substantially V shaped opening 22, the walls 23 of which opening preferably project for a short distance above the top of the base. At the apex of the opening 22 there is preferably provided a recess 24, adapted to receive and removably hold a die 25, having a curved upstanding wall 26. This die is removably held in position by means of a suitable fastening device 27, so as to permit the die to be removed and interchanged when it is desired to insert a die having a different radius, thereby accommodating the machine for folding different sized corners.

Figure 2:
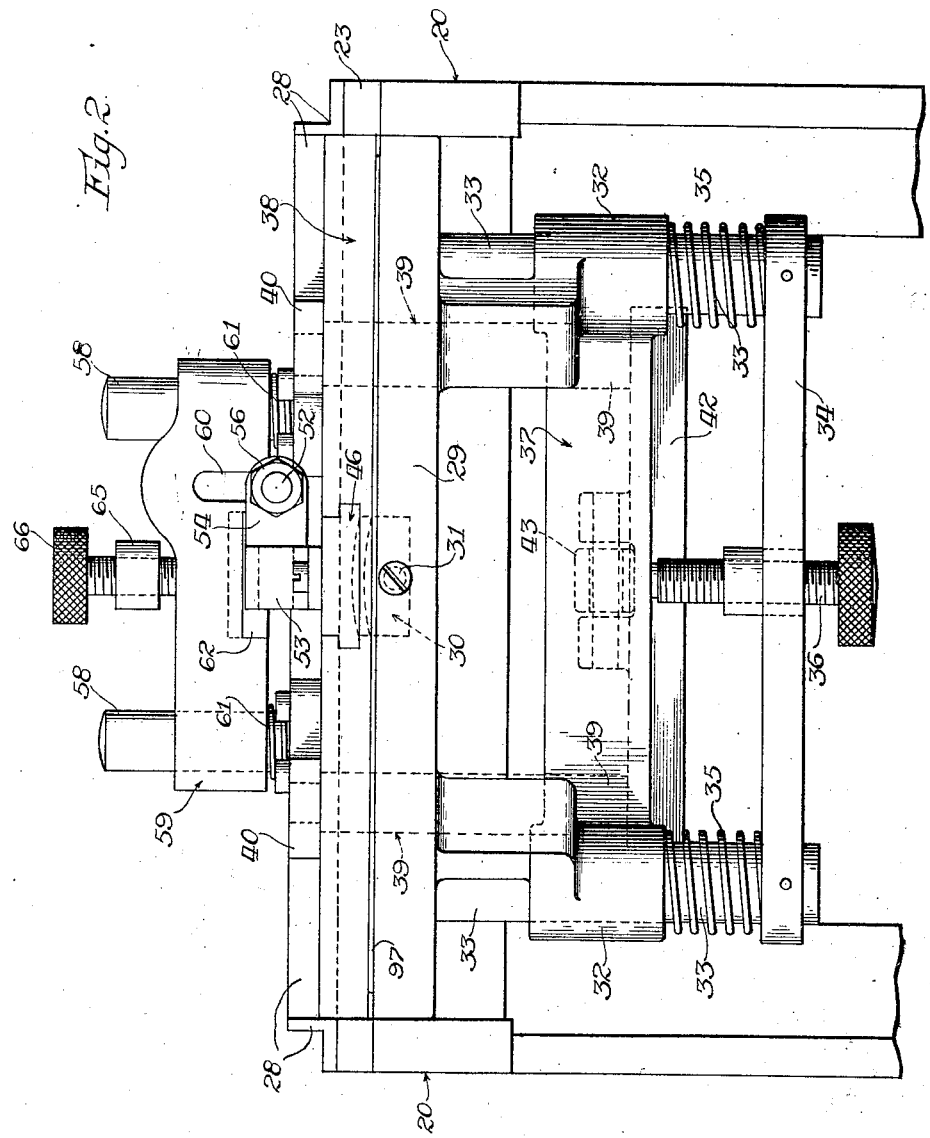
Figure 2 is a left hand end elevation of Figure 1, with parts omitted.
Figure 4:
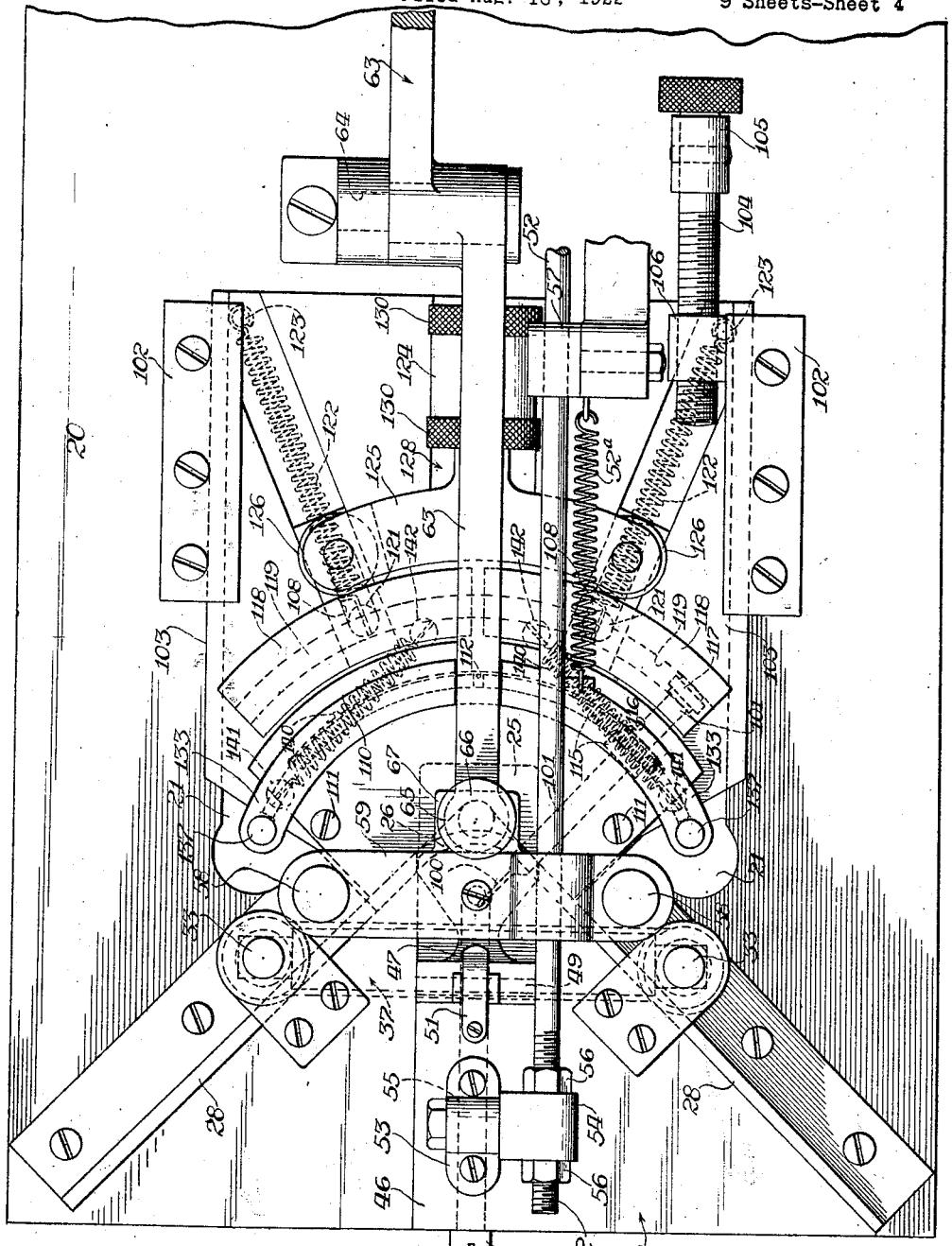
Figure 4 is an enlarged view similar to Figure 3 and with parts omitted.

Secured to the top of the walls 23 are guides 28 (see particularly Figures 2 and 4), preferably of angle iron formation, the upright walls thereof being in alinement with the ends of the portion 26 of the die 25. These guides 28 are provided for guiding the corner of the book cover into a position so that the rounded corner thereof will abut the wall 26 of the die 25.

A substantially triangular shaped work supporting table 29 fits and moves within the opening 22 of the base 20. A shaping die 30 is adjustably secured to the table 29 by means of a suitable adjusting device or screw 31, so that the position of the die 30 may be varied with respect to the table. This die 30 co-operates with the portion 26 of the die 25 and conforms to the contour thereof and is movable upwardly and downwardly with respect to the die 25.

The table is supported for vertical reciprocating movement in any desired or suitable manner preferably by means of bearings 32 connected therewith and movable upon guides 33 (see particularly Figure 2), one end of each of which guides is secured in each of the openings 34ª (Figure 10) of the base 20 and depend therefrom. Connected with the lower ends of the guides 33 is a connecting bar 34 and interposed between this bar 34 and each of the bearings 32 is an elastic member 35, such as a coil spring or the like which encompasses the respective bearings 32, so that one end thereof will engage the bar 34 and the other end the bearing 32. These elastic elements 35 tend normally to raise the table 29 to a position that the upper surface of the die 30 will stand substantially flush with the upper surface of the portion 26 of the die 25 (see particularly Figure 5). The extent of the lowering movement of the table 29 is controlled in any desired or suitable manner preferably by means of a stop 36, adjustably connected with the bar 34, arranged in the path of movement of a connecting bar 37, between the bearings 32. This adjustable stop is provided as a means whereby the extent of movement of the table 29 may be varied according to the thickness of the material being operated upon.

Figure 10:
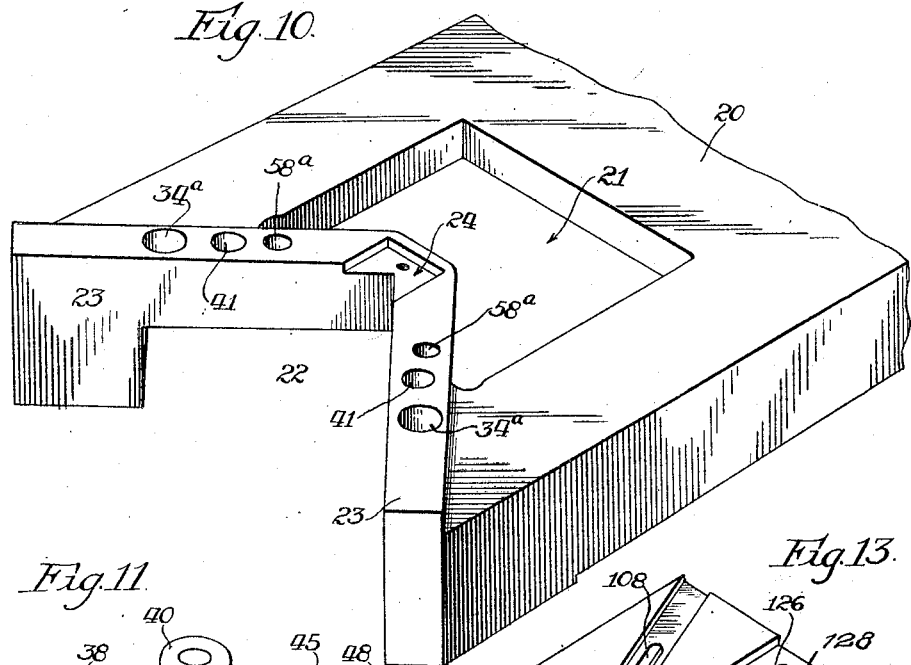
Figure 10 is a detail perspective view of a portion of the supporting bed of the machine.
Figure 11:
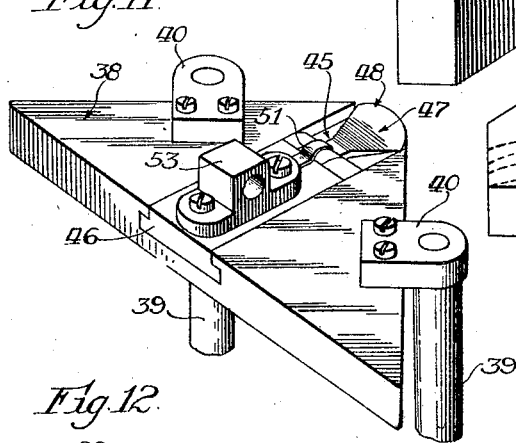
Figure 11 is a detail perspective view of the clamping plate and re-enforcing and shaping member.
Figure 12:
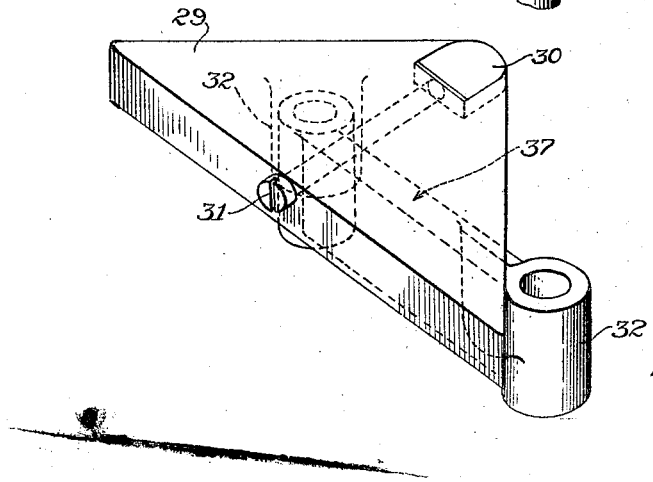
Figure 12 is a detail perspective view of the movable work support.

Co-operating with the table 29 and disposed thereabove and being of substantially the same shape is a clamping member 38, to which depending bars 39 are secured in any suitable manner such as by means of brackets 40, and which bars 39 pass loosely through suitable guide openings 41 in the walls 23 of the base 20 (see particularly Figures 5, 7 and 10). The lower extremities of these bars 39 are connected by means of a cross bar 42 and to which bar 42 is connected one end of a lever 43 arranged below the bed 20 and which lever is pivotally mounted intermediate its ends as at 44, and adapted to be rocked about its pivot, in a manner to be hereinafter set forth for lowering the clamping member 38 to clamp the work upon the table 29 and which lowering movement will cause the table with the work thereupon to be lowered against the stress of the springs 35 during one portion of the operation of the mechanism.

The clamping member 38 is provided with a recess 45 therein extending through one corner thereof and arranged within this recess is a slide 46 having pivotally connected at the forward end thereof a combined re-enforcing and shaping element 47, the forward edge 48 of the element 47 being curved and conforms to the contour of the edge of the die 30 and of the portion 26 of the die 25. The element 47 is pivotally connected as at 49 with the slide 46 and the lower edge of the rear wall of the element 47 is cut away as at 50 (see particularly Figures 15 to 17) so as to permit the forward edge 48 of the element 47 to move downwardly with respect to the slide 46, a spring 51 being provided and which tends normally to move the edge 48 downwardly with respect to the clamping member 38.

The slide 46 is adapted to be reciprocated in the recess 45 in any desired or suitable manner such as by means of a bar or rod 52, pivotally connected with a bearing 53 carried by the slide 46, and through the medium of a collar 54 having a trunnion 55 journaled in the bearing 53. This collar 54 is adjustably secured to the rod 52 by means of nuts or collars 56 threaded upon the rod on opposite sides of the collar.

The rod 52 slides through a pivotally mounted bearing 57, so as not to interfere with the reciprocating movement imparted to the clamping member 38.

Upright guides 58 project above the base 20 and are preferably secured thereto in suitable openings 58ª (see particularly Figure 10) in the walls 23, and movable upon these guides is a reciprocable member 59. This member is disposed to extend across the clamping member 38 and the re-enforcing and shaping element 47, the member 59 being provided with a cut away portion 60 to receive the bar or rod 52, so as not to interfere with the reciprocation of the members 59 and 38. This member 59 is preferably supported by means of elastic elements 61, such as coiled springs or the like which encompass the guides 58 and tend normally to raise the element 59.

Carried by this element 59 is a die 62, which is adapted to be brought into operation, at the proper time, as will be hereinafter set forth, for pressing down and sealing the folded portions of the corner.

The member 59 is adapted to be lowered against the stress of the elastic element 61 by means of a suitable lever 63 pivotally supported intermediate its ends as at 64, one end 65 terminating adjacent the member 59 and carrying an adjustable screw or bolt 66, one end of which latter is adapted to engage a projection 67 carried by the element 59. The lever 63 is rocked about its pivot in any suitable manner, as will be hereinafter set forth, and by adjusting the bolt or screw 66 with respect to the lever 63, the extent of movement of the element 59 may be varied.

Figure 3:
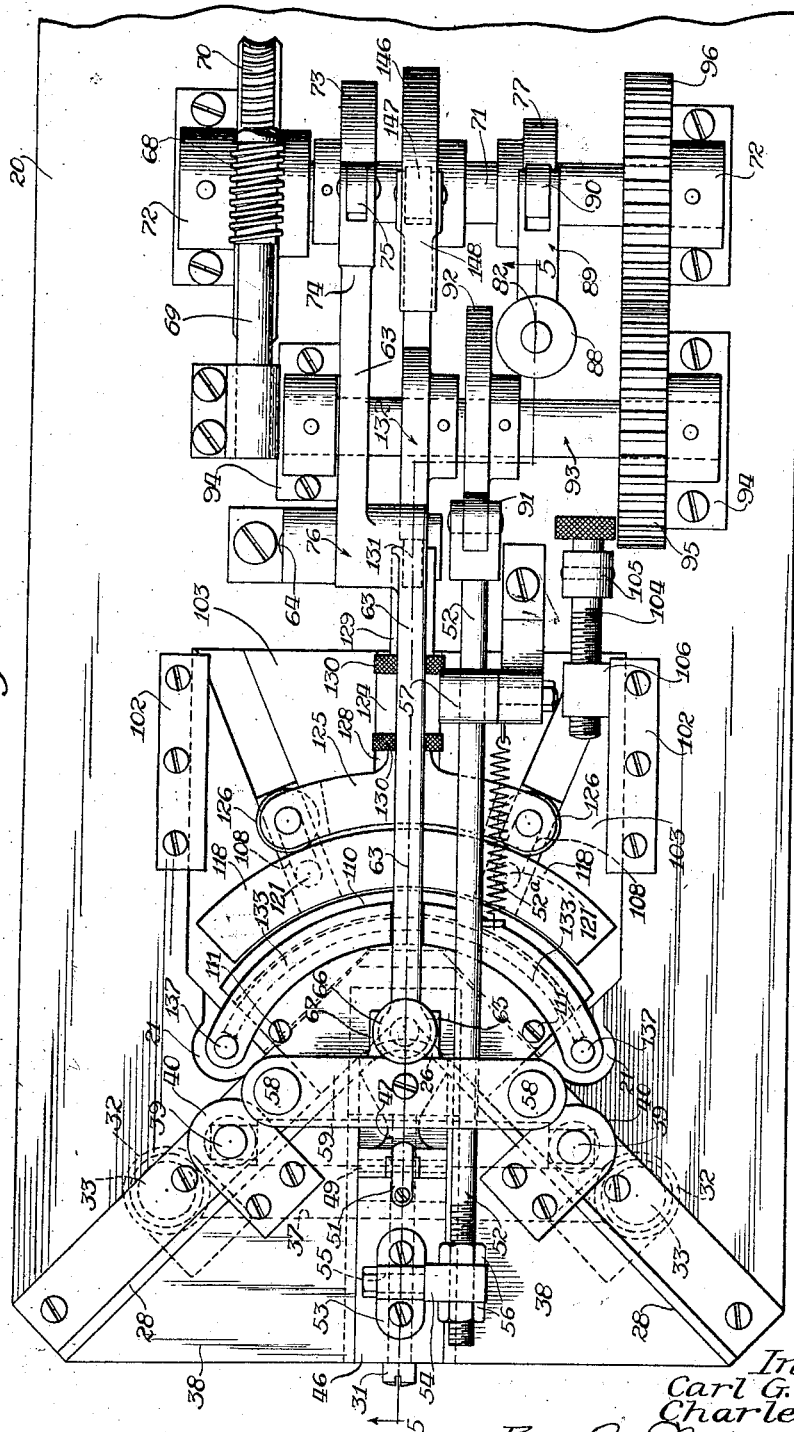
Figure 3 is a top plan view of Figure 1 with parts omitted.

The parts thus far described are operated from a single source of power through the medium of a worm 68 (see particularly Figures 1 and 3) connected with the shaft 69 journaled in suitable bearings, and which shaft receives its motion from any suitable source of power.

The worm 68 meshes with a worm gear 70 carried by a shaft 71 mounted in suitable bearings 72.

Connected with the shaft 71 is a cam 73, with which the end 74 of the lever 63 cooperates, preferably through the medium of an anti-friction roller 75, which engages the cam. The ends 65 and 74 of the lever 63 are preferably offset as at 76.

Connected also with the shaft 71 is a cam 77 for operating the lever 43 and which latter is located beneath the base 20. Connected with the end 78 of the lever 43 (see particularly Figures 3 and 5) and by means of a pin and slot connection 79—80 is an upright 81, which passes through the base 20, the upper portion 82 of the upright is preferably reduced to form a shoulder 83. The reduced portion 82 of the upright passes through a suitable bearing or housing 84, having an enlarged recess 85 therein to provide a shoulder 86. Arranged within this recess 85 and encompassing the reduced portion 82 of the upright 81 is an elastic member such as a coil spring 87, one end of which engages and rests against the shoulder 83, while the other end engages and rests against the shoulder 86. Secured to the upper end of the upright 81 by means of adjustable nuts or collars 88 is an arm 89 preferably provided with a roller 90 on the end thereof, and which roller engages and co-operates with the cam 77 so that when the shaft 71 is rotated the high portion of the cam 77 will engage the roller 90 to raise the arm 89 and with it the upright 81 against the stress of the spring 87 to rock the lever 43 about its pivot 44, and in so doing will depress or lower the clamping member 38 so as to clamp the work against the movable table 29, during a portion of the pivotal movement of the lever 43 in one direction. A further movement of these parts in the same direction will cause the clamping member 38 to depress the work supporting table 29 against the stress of the springs 35. The spring 87 will, at the proper time in the operation move the lever 43 in the opposite direction to raise the clamping member 38 and during this raising movement of the clamping member, the stress of the springs 35 will cause the work supporting plate or table 29 to follow with the clamping member until the table 29 reaches the limit of its upward movement, that is until the top of the die 30 is substantially flush with the top of the portion 26 of the die 25. After the parts have reached this position, the spring 87 will continue to act upon the clamping member 38 and raise the latter to the limit of its upward movement to permit the withdrawal of the work and the insertion of new work.

At the proper time in the operation of these parts, that is after the corner of the work has been folded and the operation is about completed, the presser die 62 will be lowered against the stress of the springs 61 by rocking the lever 63 about its pivot.

It is not until after the operations of the clamping member 38 and the table 29 that the lever 63 is rocked to bring the presser die 62 into operation.

During the folding operation and just at approximately the period in the operation that the clamping member 38 engages the work upon the table 29 and before the table 29 begins to lower, the slide 46 is advanced with respect to the clamping member 38 so as to properly position the edge 48 of the re-enforcing and shaping member 47 with respect to the portion 26 of the die 25 and the edge of the die 30. This advancing movement is accomplished preferably through the medium of a spring 52ª connected with the bar or rod 52, and carried by the free end of the bar is an anti-friction roller 91, which co-operates with a cam 92 carried by a countershaft 93 journaled in suitable bearings 94, and which countershaft has connected with it a gear 95, which meshes with a gear 96 carried by the shaft 71. The member 47 is moved in the opposite direction and against the stress of the spring 52ª by the cam 92.

At the beginning of the operation of folding the corners of the work 97 (see particularly Figure 9) the edges 98 of the cover are folded down upon the body thereof so as to form a loop shaped portion 99 at the corner thereof, and before the work is placed into the machine.

When the work is inserted into the machine the clamping member 38 is in an elevated position (see particularly Figure 15), as is also the work supporting table 29, the upper surface of the die 30 carried by the member 29 stands substantially flush with the upper portion of the surface 26 of the die 25. With the parts in this position, the work is then inserted by placing the edges of the cover against the guides 28 and the work is moved inwardly until the outer surface of the loop 99 will be in close proximity to the front edge of the portion 26 of the die 25. The clamping member 38 is then lowered in the manner as already described and just as it engages the work the slide 46 is advanced by the spring 52ª to position the edge 48 of the element 47 in proximity to the die 25 and the edge of the die 30. During the advancing movement of the slide 46 and by reason of the hinged connection between the element 47 and the slide 46 the spring 51 will cause the edge 48 of the element 47 to be held in close proximity to the work and in such a position that the edge 48 will pass under the partially folded edges of the work. As soon as the element 47 is properly positioned, the continued lowering movement of the clamping member 38 will cause the work supporting table 29 to be lowered against the stress of the springs 35. During this lowering movement of these parts, the loop 99 (see particularly Figure 16) will, by reason of the portion 26 of the die 25, be caused to be folded upwardly to be engaged by folding fingers or members (to be hereinafter described) to fold the upwardly standing portion over the reenforcing and shaping member 47. The fingers are then removed and the slide 46 will also be quickly retracted so that the pressing die 62 will engage the folded material at the corner of the work, to press and seal the folds against the body of the work, as shown in Figure 17. The clamping member 38 will then be elevated and the work may be readily removed.

After the parts have assumed the position shown in Figure 16, the upstanding portion of the loop 99 of the work 97 is folded over the re-enforcing and shaping member 47 to be sealed down against the body of the work, it being of course understood that the face of the portion of the work forming the loop 99 is coated or provided with adhesive material.

This folding operation is accomplished by means of suitable folding members preferably in the form of fingers 100 which are formed on the extremities of shafts 101. Any number of these fingers may be employed which are desired or necessary. In the present exemplification of the invention six fingers are shown and as the construction and operation of each of these fingers is the same the description of one will apply equally as well to them all.

Supported by the base 20 adjacent the opening 21 are guides 102 for holding a plate 103 adjustably positioned over the opening and this plate may be adjusted in any suitable manner such as by means of an adjusting bolt 104 rotatably mounted in a bearing 105 and having threaded connection with the member 106 carried by the plate 103.

Figure 13:
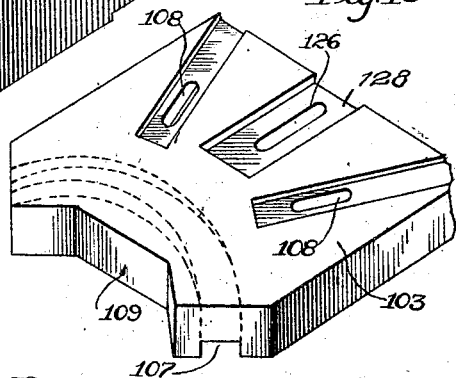
Figure 13 is a perspective view of a detail.
Figure 14:
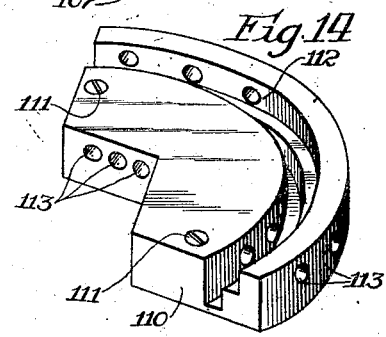
Figure 14 is a perspective view of another detail.

This plate is provided on its under face with a segmental groove 107, (see Fig. 13) for a purpose to be hereinafter set forth, and also a plurality of slots 108 passing therethrough and in the rear of the grooves 107.

These slots 108, as well as the groove 107, register with the opening 21 and the forward edge of the plate 103 is shaped as at 109 to receive the corner formed by the walls 23 of the base 20, adjacent the opening 21.

A guide member 110 is mounted upon the plate 103 and is held against movement in any suitable manner such as by means of fastening devices 111, the member being provided with a segmental groove 112 opening through the upper face thereof. This member is also provided with a plurality of radially disposed bearing openings 113, which intersect the groove 112. The shafts 101 of the fingers 100 are journaled in and pass through these openings 113 and splined upon each of the shafts 101, preferably by means of a key or feather 114, is a disc 115, the disc being provided with a laterally projecting lug or pin 116 also disposed within the groove 112, the disc being held within the groove 112 for rotation with the shaft 101, while the shaft is adapted to be shifted longitudinally and with respect to the disc 115 to withdraw or advance the fingers 100 during the operation of the machine.

Secured to the end of each of the shafts 101 is a disc or head 117, which fits within a segmental shaped member 118, the member 118 resting upon the plate 103. This member 118 is provided with a chamber 119 therein having an opening 120 in the front wall thereof, the chamber 119 opening through the ends of the member so as to permit the discs or members 117 on the shaft 101 to enter the chamber 119, while the shaft 101 projects through the opening 120 in the member 118.

This member 118 is adapted to be reciprocated toward and away from the guide member 110 to advance or retract the fingers 100 and this may be accomplished in any suitable manner.

Two of these members 118 are provided, one for each series of fingers 100 and each of the members 118 is provided with a depending projection 121 adapted to pass through one of the slots 108 in the plate 103. These slots 108 are arranged on an incline so that the members 118 will have a radial movement toward and away from the guide member 110. A spring 122 is anchored by one extremity to the depending projection 121 and is connected by its other extremity with a fixed anchor 123 (see particularly Figure 5). The normal tendency of the spring 122 is to retract the member 118 so as to withdraw the fingers 100.

The members 118 are moved forwardly against the stress of the springs 122 preferably by means of an actuating member 124, having laterally projecting arms 125, connected with which arms are anti-friction rollers 126. These rollers engage the faces of the members 118 so that when the member 124 is advanced the members 118 will also be advanced and against the stress of the springs 122.

In order to maintain this member 124 against displacement or against a tilting movement, there may be provided a slot 126$^a$ in the plate 103, through which slot a fastening bolt 127 passes. The bolt is preferably removably connected with the member 124 while the head thereof engages and moves along the lower face of the member 103. If desired the portion of the plate 103 adjacent the member 124 may be recessed as at 128 to form a guide for the member 124.

A bolt 129 is connected with the member 124 preferably by passing therethrough and having connected therewith nuts or collars 130 on each side of the member. This bolt 129 is provided with an anti-friction roller 131, which engages and co-operates with a cam 132 connected with the shaft 93 for rotation therewith. The spring 122 also serves as a means for maintaining the roller 131 in operative contact with the cam 132.

Segmental shaped members 133 are arranged above the groove 112 in the member 110. These members 133 are provided with portions 134 which project into the groove 112 and these portions 134 are provided with downwardly opening recesses 135 and into which recesses the pins 116 on the discs 115 carried by the shafts 101 project so that when the members 133 are moved forwardly and backwardly in the slot 112 in the stationary guide member 110, rotation will be imparted to the disc 115 and as these discs are connected with the shafts 101 for rotation therewith, the shafts 101 together with the fingers 100 will be rotated but this rotating mechanism will not interfere with the longitudinal shifting movement of the shafts 101 with relation to the respective discs 115.

Any suitable means may be provided for operating the members 133 (see particularly Figures 5, 6 and 7). A suitable and efficient means for accomplishing this result embodies two segmental shaped members 136 arranged beneath the plate 103 and operating in the groove 107 in the plate. One of these members 136 is disposed beneath each of the segmental shaped members 133 and each is connected preferably by one extremity with one of the members 133 through the medium of a connecting member 137 and these connecting members 137 pass through the opening 21 in the base 20 so that as the members 136 are moved within the slot 107 the members 133 will be correspondingly moved.

Any suitable means may be provided for shifting the members 136 but there is preferably provided a cam face or surface 138 on depending portions 139 of the members 136. These cam surfaces 138 are disposed adjacent and in opposition to each other. Elastic members 140 preferably in the form of coiled springs (see particularly Figures 5 and 7) are connected by one end with a stud 141, which in turn is connected with the member 136 and the other end of the spring is connected with a fixed anchor 142. The normal tendency of these springs 140 is to move the members 136 in the groove 107 in a direction that the cam surfaces 138 will stand in close proximity to each other.

A lever 143 is pivotally mounted intermediate its ends as at 144 beneath the base 20. The free end 145 of this lever is preferably rounded for a considerable distance along its length and is adapted to be moved between the cam surfaces 138 so as to separate the members 136 against the stress of the springs 140, and to be moved in another direction with respect to these cam surfaces 138, so as to permit the springs 140 to move the members 136 in the opposite direction.

This lever 143 is adapted to be rocked about its pivot by means of a cam 146 (see particularly Figures 1 and 3), and which cam engages an anti-friction roller 147 on the end 148 of the lever 143, and which end 148 is deflected and passes through a suitable aperture 149 in the base 20. Thus it will be seen that when the cam 146 rocks the lever 143 so as to elevate the end 145, this end will be forced between the cam faces 138 to separate them and, as these cam surfaces are separated the members 136 will be moved away from each other in the groove 107 of the plate 103, and as the segmental members 133 are connected with the members 136, these members 133 will be also moved in the groove 112 of the guide member 110. This movement of the members 133 will rotate the fingers 100 in one direction. When the lever 143 is operated in the opposite direction to move the end 145 in another direction with respect to the cam faces 138, the springs 140 will operate to draw the members 136 towards each other and will return the members 133 so as to rotate the fingers 100 in the opposite direction.

By adjusting the bolt 129 with respect to the member 124 it is obvious that the extent of movement of the member 124 may be varied and this variation in the movement of this member will correspondingly influence the co-operating parts.

It is thought that the operation will be fully understood from the foregoing description and especially the operation of the folding fingers 100 but, briefly stated the operation is as follows.

It is to be understood that all of the parts are operated in timed relation so that each will perform its function without interfering with the operation of the other.

Assuming the parts to be in the position shown in Figure 15, the work 97 has just been placed in the machine and has been moved forwardly until arrested by the guides 28 so that the loop 99 stands in close proximity to and projects over the portion 26 of the guide 25. The folding fingers 100 have been retracted.

During the first portion of the operation the clamping plate 38 is lowered in the manner as already described and the re-enforcing and shaping member 47 will be moved forwardly until the edge 48 thereof coincides with the edge of the die 30 on the work supporting table 29. A further lowering movement of the clamping member 38 will depress the work supporting table 29 against the stress of the supporting springs. As this table 29 lowers the die 25 will cause the loop shaped portion 99 of the work to be turned upwardly as shown in Figure 16. Just at this point in the operation, the cam 132 operates to move the member 124 forwardly into the position shown in Figure 8, which will cause the fingers 100 to be shifted with relation to the respective discs 115 so that the ends of the fingers 100 will engage the upwardly projecting portion of the loop 99 of the work. As the fingers 100 advance they will depress the upwardly projecting portion of the work over the re-enforcing and shaping member 47 and at a predetermined time in the advancing movement of these fingers 100, the lever 143 will be operated by the cam 146 to move the end 145 of the lever between the cam faces 138 of the members 136 to shift the segmental members 133 in the groove 112 of the guide member 110, thereby causing a rotary movement to be imparted to the shafts 101 and fingers 100 so as to cause the fingers to "lay" the folds of the corner of the work down upon the body of the work. Just before the completion of the operation of the fingers 100 upon the folded portion of the work, the re-enforcing and shaping member 47 is quickly retracted and at this point in the operation the pressing die 62 will have reached a point in its operation that as soon as the fingers 100 are retracted and the re-enforcing and shaping member 47 is also retracted, the die 62 will engage the folded corner of the work and thereby press and tightly seal the same down upon the work. This will complete the operation and when the clamping member is elevated and also the die 62, the work may be readily removed.

Obviously the machine may be adjusted to fold corners of different radii and in that event the necessary change may be made in the dies and the proper adjustment must be made to the remaining portion of the parts to produce the proper relative movement and timed operation of the various parts.

While the preferred form of the invention has been herein shown and described it is to be understood that various changes may be made in the details of construction and in the combination and arrangement of the several parts, within the scope of the claims, without departing from the spirit of this invention.

What is claimed as new is:—

1. A machine for folding round corners embodying means for holding the work, a member for re-enforcing the corner during the folding operation, means for folding the work over said member and upon itself at the corner, the last recited means having a bodily movement and axial rotation during the folding operation thereof, and means for retracting the said reenforcing member.

2. A machine of the character described embodying a movable work support, a clamping member co-operating therewith to hold the work, means for moving the clamping member, the work support being responsive in its movement to the movement of the clamping member, a re-enforcing element for the work and over which the work is foldable, means for folding the work over the said element, and means for actuating the element.

3. A machine for folding round corners embodying means for holding the work, a member for re-enforcing the corner, means for folding the work over said member and upon itself, the last recited means embodying one or more finger like elements having a bodily movement and axial rotation while operating upon the work, means for actuating the last recited means, and means for actuating the said re-enforcing member.

4. A machine for folding round corners embodying means for holding the work, a member for re-enforcing the corner, means for folding the work over said member and upon itself, the last recited means embodying one or more finger like elements, means for moving the fingers longitudinally, means for axially rotating the fingers, and means for actuating the said re-enforcing element.

5. A machine for folding round corners embodying a work support, a work clamping member co-operating therewith, a re-enforcing element movable with and with respect to the said clamping member, means for controlling the movement of said element with respect to the clamping member, one or more finger like elements, means for imparting a movement to the fingers to cause them to fold the work over the said re-enforcing element, means for imparting another and different movement to the said finger-like elements to lay down the folds of the material, and means for retracting the said re-enforcing element.

6. A machine for folding round corners embodying a work support, a work clamping member co-operating therewith, a re-enforcing element movable with and with respect to the said clamping member, means for controlling the movement of said element with respect to the clamping member, one or more finger like elements, means for imparting a movement to the fingers to cause them to fold the work over the said re-enforcing element, means for imparting another and different movement to the said fingerlike elements to lay down the folds of the material, retracting means for the re-enforcing element, and pressing means operating upon the folded portion of the work for sealing down the same after the said elements have been retracted.

7. A machine for folding round corners embodying a re-enforcing element for the material at the corner, a longitudinally shiftable and axially rotatable element for engaging the material and folding the same over the re-enforcing element, and means for imparting such movements to the second recited element.

8. A machine for folding round corners embodying a re-enforcing element for the material at the corner, a longitudinally shiftable and axially rotatable element for engaging the material and folding the same over the re-enforcing element, means for imparting such movements to the second recited element, and pressing means operable in timed relation with the second recited element for sealing down the folded material.

9. A machine for folding round corners embodying a re-enforcing element for the material at the corner, a longitudinally shiftable and axially rotatable element for engaging the material and folding the same over the re-enforcing element, means for imparting such movements to the second recited element, means pivotally mounting the said re-enforcing element, and means tending normally to depress the forward edge of said re-enforcing element.

10. A machine for folding round corners embodying a clamping member for clamping the work, a re-enforcing element for the material at the corner, means connecting said element with the clamping member for two different movements with respect thereto, means for controlling one of the movements of the re-enforcing element with respect to the clamping member, and means for folding the material over the re-enforcing element.

11. A machine for folding round corners embodying a clamping member for clamping the work, a re-enforcing element for the material at the corner, means connecting said element with the clamping member for two different movements with respect thereto, means for controlling one of the movements of the re-enforcing element with respect to the clamping member, and means for folding the material over the re-enforcing element, the last recited means embodying one or more fingers mounted for axial movement and for bodily movement in directions lengthwise of the pivot thereof.

12. A machine for folding round corners embodying a work support, a clamping member for the work, co-operating elements for partially folding the work, a re-enforcing element for the corner, means for folding the partially folded material over the said re-enforcing element, means for causing the parts to operate in timed relation with respect to each other, and means for sealing down the folded material.

13. A machine for folding round corners embodying a work support, a clamping member for the work, co-operating elements for partially folding the work, a re-enforcing element for the corner, means for folding the partially folded material over the said re-enforcing element, the said means embodying one or more rotatable and axially shiftable finger like members, and means for causing the parts to operate in timed relation with respect to each other.

14. A machine for folding round corners embodying a reciprocable work supporting table, a clamping member co-operating therewith, means for actuating the said member, the reciprocation of the said table being responsive to the operation of said member, a re-enforcing element for the work, said re-enforcing element being movable with and with respect to the clamping member, one or more finger like elements for engaging and folding down the partially folded work, means for shifting the finger lengthwise of its axis, and means for rotating the finger at predetermined points in its shifting movement, the said parts operating in timed relation with respect to each other.

15. A machine for folding round corners embodying a reciprocable work supporting table, a clamping member co-operating therewith, means for actuating the said member, the reciprocation of the said table being responsive to the operation of said member, a re-enforcing element for the work, said re-enforcing element being movable with and with respect to the clamping member, means co-operating with a portion of said table whereby upon the movement of the table the work will be partially folded, one or more finger like elements for engaging the said partially folded work and folding the same over the said re-enforcing element, the said parts operating in timed relation with respect to each other.

16. A machine for folding round corners embodying a reciprocable work supporting table, a clamping member co-operating therewith, means for actuating the said member, the reciprocation of the said table being responsive to the operation of said member, a re-enforcing element for the work, said re-enforcing element being movable with and with respect to the clamping member, means co-operating with a portion of said table whereby upon the movement of the table the work will be partially folded, one or more finger like elements for engaging the said partially folded work for folding the same over the said re-enforcing element, means for shifting the said finger in directions lengthwise of its axis, and means for rotating the finger.

17. A machine for folding round corners embodying a reciprocable work supporting table, a clamping member co-operating therewith, means for actuating the said member, the reciprocation of the said table being responsive to the operation of said member, a re-enforcing element for the work, said re-enforcing element being movable with and with respect to the clamping member, means co-operating with a portion of said table whereby upon the movement of the table the work will be partially folded, one or more finger like elements for engaging the said partially folded work for folding the same over the said re-enforcing element, means for shifting the said finger in directions lengthwise of its axis, means for rotating the finger, and means for sealing down the work folded by said finger, the said parts operating in timed relation with respect to each other.

18. A machine for folding round corners embodying a finger like member for folding the work, means for imparting a longitudinal movement to the finger, and means for axially rotating the finger at predetermined points in the longitudinal movement of the finger.

19. A machine for folding round corners embodying a finger like element for folding the work, a member with which the said element is connected for movement therewith and with respect thereto, means for maintaining the said member against lateral movement, means for moving the finger like element in a direction lengthwise of the axis of the element, and means for actuating the said member for imparting an axial rotation to the finger at predetermined points in its longitudinal movement.

20. A machine for folding round corners embodying a finger like element, a disc like element, a spline connection therebetween, means for holding the disc against lateral movement, means for moving the finger like element with relation to the disc and axially of the finger, and means operatively connected with the disc for rotating the latter to rotate the finger at predetermined points in the axial movement of the finger.

21. A machine for folding round corners embodying a finger like element for folding the work, a member with which the said element is connected for movement therewith and with respect thereto, means for maintaining the said member against lateral movement, means for moving the finger like element in a direction lengthwise of the axis of the element, and means for actuating the said member for imparting pivotal movement to the finger at predetermined points in its longitudinal movement, in combination with means for engaging and pressing down the material folded by said finger like element.

22. A machine for folding round corners embodying a finger like element, a disc like element, a spline connection therebetween, means for holding the disc against lateral movement, means for moving the finger like element with relation to the disc and axially of the finger, and means operatively connected with the disc for rotating the latter to rotate the finger at predetermined points in the axial movement of the finger, the second recited means embodying mechanism whereby the extent of the axial movement may be varied at will.

23. A machine for folding round corners embodying a finger like element, a disc like element, a spline connection therebetween, means for holding the disc against lateral movement, means for moving the finger like element with relation to the disc and axially of the finger, and means operatively connected with the disc for rotating the latter to rotate the finger at predetermined points in the axial movement of the finger, the last recited means embodying cam mechansm.

24. A machine for folding round corners embodying a re-enforcing element for the work, means for positioning said element at the corner, a finger like element, a member with which the finger is connected for movement therewith and with respect thereto, means for maintaining the member against lateral movement, means for shifting the finger longitudinally and with respect to the said member to engage and fold the work over the said re-enforcing element, means operating upon the said member for moving the latter to impart a pivotal movement to the finger at predetermined points in the longitudinal movement of the finger, and means for retracting the said re-enforcing element.

25. A machine for folding round corners embodying a re-enforcing element for the work, means for positioning said element at the corner, a finger like element, a member with which the finger is connected for movement therewith and with respect thereto, means for maintaining the member against lateral movement, means for shifting the finger longitudinally and with respect to the said member to engage and fold the work over the said re-enforcing element, means operating upon the said member for moving the latter to impart a pivotal movement to the finger at predetermined points in the longitudinal movement of the finger, means for retracting the said re-enforcing element, and means adapted to engage and press down the folded work, all of the parts operating in timed relation with respect to each other.

26. A machine for folding round corners embodying one or more finger like elements, a member with which the finger is connected for movement therewith and with respect thereto, means for holding the member against lateral movement, means for moving the finger element lengthwise of its axis and with respect to the said member, means operating upon the said member for shifting the same to rotate the said finger axially, the last recited means embodying a cam surface, an element operating upon the cam surface, and means for actuating the last recited element.

27. A machine for folding round corners embodying one or more finger like elements, a member with which the finger is connected for movement therewith and with respect thereto, means for holding the member against lateral movement, means for moving the finger element lengthwise of its axis and with respect to the said member, means operating upon the said member for shifting the same to rotate the said finger axially, the last recited means embodying a cam surface, an element operating upon the cam surface to move the last said means in one direction, and means for moving the last said means in the opposite direction.

28. A machine for folding round corners embodying two sets of work folding finger like elements, means supporting the said fingers for longitudinal movement, means for imparting an axial rotation to the fingers at predetermined points in their longitudinal movements, means for imparting longitudinal movement to the fingers, the last recited means embodying connecting members individual to the sets of fingers, and means common to the said connecting members for actuating them.

29. A machine for folding round corners embodying two sets of work folding finger like elements, means supporting the said fingers for longitudinal movement, means for imparting an axial rotation to the fingers at predetermined points in their longitudinal movements, means for imparting longitudinal movement to the fingers, the last recited means embodying connecting members individual to the sets of fingers, means common to the said connecting members for actuating them, in one direction, and means individual to the connecting members for moving them in the opposite direction.

30. A machine for folding round corners embodying two sets of work folding finger like elements, means supporting the said fingers for longitudinal movement, means for imparting an axial rotation to the fingers at predetermined points in their longitudinal movements, means for imparting longitudinal movement to the fingers, the last recited means embodying connecting members individual to the sets of fingers, and means common to the said connecting members for actuating them, the last recited means embodying mechanism whereby the extent of movement of the said connecting members may be varied to vary the extent of longitudinal movement of the fingers.

31. For use in a round corner folding machine, a re-enforcing element having a rounded extremity adapted to pass under the partially folded material to a position to co-incide with the round corner of the work, a slide to which the said element is pivoted, and means for causing the said element to hug the body of the work as the element is advanced into operative position.

32. For use in a round corner folding machine, a re-enforcing element having a rounded extremity, means for passing said element under the partially folded material to a position to co-incide with the round corner of the work, the said means including a slide to which the element is pivoted, and a spring operating upon said element to hold the said extremity thereof in close contact with the body of the work as the element is moved into operative position.

33. For use in a round corner folding machine, a re-enforcing element having a rounded extremity, means for passing said element under the partially folded material to a position to co-incide with the round corner of the work, the said means including a slide to which the element is pivoted at a point remote from the said edge of the element, the said element being cut away at its rear edge adjacent its pivot to permit the front edge of the element to be depressed with respect to the slide, and means operating upon said element and tending normally to move the element about its pivot in a direction to depress the forward edge of the element.

34. A machine for folding round corners embodying a vertically movable work supporting table, a die member adjacent the path of movement of and co-operating with the table to partially fold the work when the table is depressed, a clamping member co-operating with the table for holding the work, one portion of the work projecting over the die when the work is placed upon the table, means for moving the clamping member to engage the work and depress the table, said die operating to turn up the portion of the work projecting thereover, a finger like element, means for moving the finger longitudinally to engage the upturned work adjacent the die, means for rotating the finger at a predetermined point in its longitudinal movement to turn down the folded portion of the work upon the body of the work, and means for sealing down the folded work, the parts operating in timed relation with respect to each other.

35. A machine for folding round corners embodying a vertically movable work supporting table, a die member adjacent the path of movement of and co-operating with the table to partially fold the work when the table is depressed, a clamping member co-operating with the table for holding the work, one portion of the work projecting over the die when the work is placed upon the table, means for moving the clamping member to engage the work and depress the table, said die operating to turn up the portion of the work projecting thereover, a finger like element, means for moving the finger longitudinally to engage the upturned work adjacent the die, a re-enforcing member movable into position adjacent the corner under the partially folded work and over which member the corner is folded, means for rotating the finger at a predetermined point in its longitudinal movement to turn down the folded portion of the work upon the body of the work, and means for sealing down the folded work, the parts operating in timed relation with respect to each other.

In testimony whereof we have signed our names to this specification, on this 19th day of July, A. D. 1922.

CARL G. ROLINE.
CHARLES NORRE.